Sept. 17, 1935.   R. R. HAINES   2,014,618
PRESSURE REGULATOR AND EQUALIZER FOR VEHICLE TIRES
Filed June 22, 1934
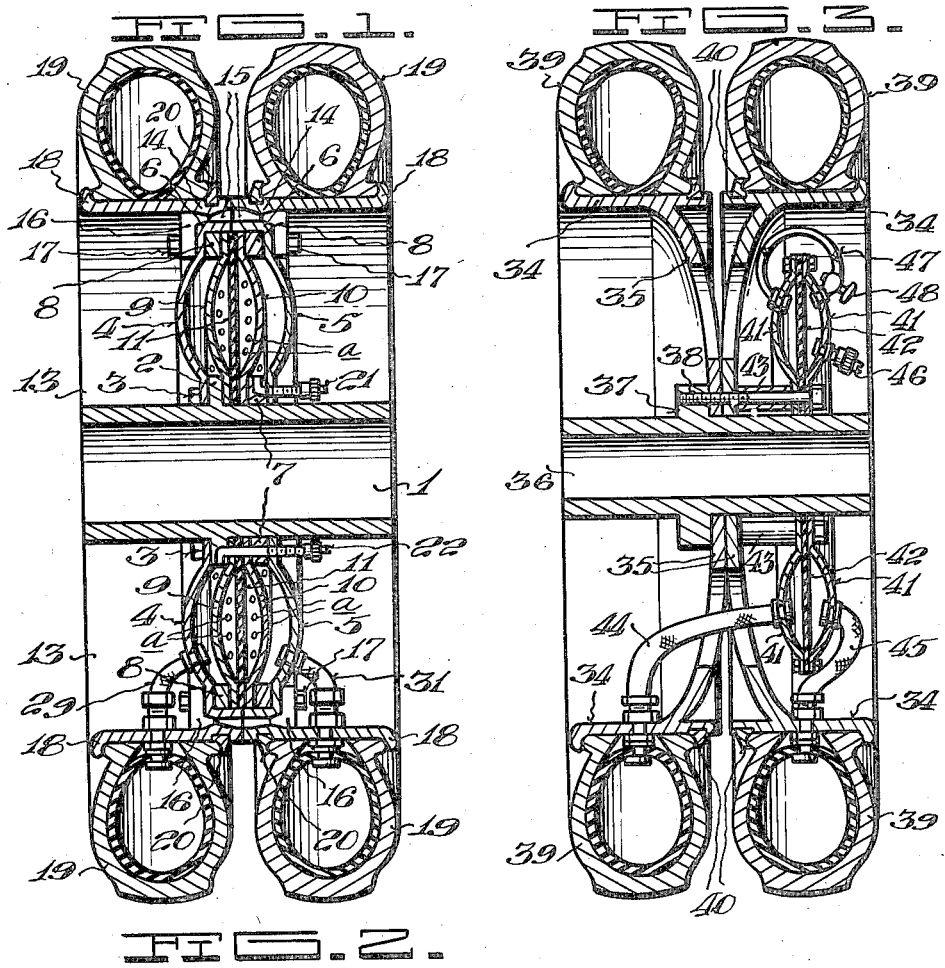
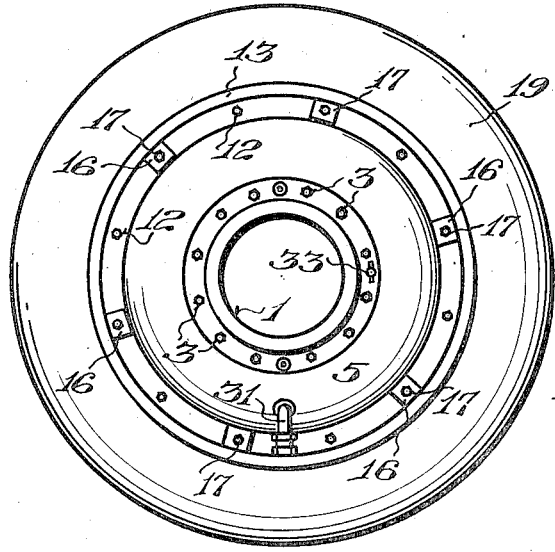
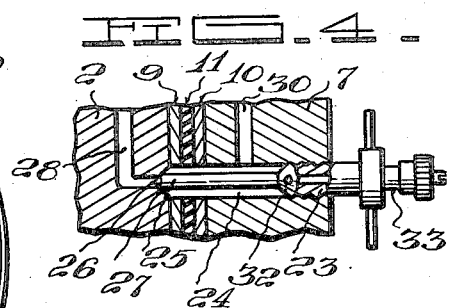
Raymon R. Haines
INVENTOR
BY
ATTORNEY Patented Sept. 17, 1935

2,014,618

UNITED STATES PATENT OFFICE 2,014,618

PRESSURE REGULATOR AND EQUALIZER FOR VEHICLE TIRES

Raymon R. Haines, Dallas, Tex.

Application June 22, 1934, Serial No. 731,934

5 Claims. (Cl. 152—29)

This invention relates to heavy duty vehicle wheels and it has particular reference to wheels and attachments to wheels whereby an equalized pressure of air may be maintained in dual pneumatic tires carried by said wheels.

The principal object of the invention is to provide a dual vehicle wheel with an attendant air displacement chamber for each tire of sufficient capacity to relieve the tire of increased pressure, due to expansion by heating, collision with objects and other causes. Provisions are likewise made for effecting displacement of the air rapidly and in fact, since the communications between the tires and their respective air chambers are comparatively large and at all times open, they are responsive to even slight pulsations due to vibrations occurring when the tires strike irregularities in the highway.

Another object of the invention is to provide a diaphragm as a separating medium between the adjacent air chambers which is responsive to the increase in pressure in the chambers and therefore increases the capacity of the respective chambers as required when the pressure in the tires is increased.

Still another object of the invention is to provide, as a reinforcing medium for the diaphragm, an annular, curved backing plate, pervious to air and designed to limit the movement of the diaphragm should the air be released from one of the tires, as by a puncture or the like. The presence of this plate will prevent the diaphragm from moving too far and thus allow the displacement of too much air in the companion tire should air be expelled from the other tire.

Yet another object of the invention is to provide means to effect communication between the air chambers, normally separated, for the purpose of equalizing the pressure in the tires. Also, this means may be used for primarily inflating the tires simultaneously.

With the foregoing objects as paramount, the invention has particular reference to its salient features of construction and arrangement of parts which will become manifest as the description proceeds, taken in connection with the accompanying drawing, wherein:—

Figure 1 is a sectional view taken on the diametrical line 1—1 through Figure 2.

Figure 2 is a side elevation of the invention.

Figure 3 is a modified form of the invention in that the device shown is an attachment for conventional wheels, and Figure 4 is a fragmentary detail view of the equalizer valve employed in the structure shown in Figures 1 and 2.

Continuing with a more detailed description of the drawing, reference is made primarily to Figure 1 in which 1 designates the hub of the wheel, having an annular shoulder 2 thereon. To this shoulder is secured by means of bolts 3 the flange 4. This flange is annularly curved so as to be symmetrical with a companion flange 5 on the opposite side of the wheel. Both flanges have their outer edges 6 turned relatively inward and are in contiguous relationship.

Since it is necessary that the wheel be constructed to be disassembled, the flange 5 is bolted to an annular ring 7 removably surrounding the hub 1 and the outer edges of the flanges each embrace the rings 8.

Within the chamber thus defined by the flanges 4 and 5 are plates 9 and 10, oppositely curved to be symmetrical with the flanges 4 and 5. These plates are perforated at $a$ so as to be pervious to air. The outer edges of these plates lie between the outer rings 8, as shown, and between the plates is disposed the edge of a flexible diaphragm 11.

The flanges 4 and 5, rings 8, plates 9 and 10 and the diaphragm 11 are all securely bound together by means of bolts 12, passing entirely through the flanges, as shown. The inner edges of the assembly are secured by the bolts 3, which are passed entirely through the flanges 4 and 5, embracing the annular shoulder 2, plates 9 and 10, the interposed diaphragm 11 and the annular ring 7.

The foregoing explains how the assembly is secured together and to the hub 1. Now, rim 13 is in circumferential sections, each section having an annular rib 14 on its inner periphery. These ribs are contiguous and have angularly opposed sides and disposed in conformity with one side of each rib is an annular ring 15. Also in conformity with the opposite sides of these ribs are lugs 16 which are held secure by bolts 17.

The edges of the rim 13 are curved at 18 to conform to the bead of the tires 19 on one side and a split rim 20 secures the opposite bead of the tire. This construction is conventional.

A valve 21 admits air into the chamber defined by the flange 5 and the diaphragm 11 and a valve 22 admits air into the companion chamber defined by the diaphragm and the opposite flange 4.

In Figure 4 is shown a combination screw type and back pressure valve designed to equalize the pressure in both of the chambers and consequently the tires. This valve is comprised of a plug 23 which is threaded into an orifice 24. An extension 25 terminates into a needle valve 26 seating at 27 in an air passage 28, which latter communicates with the air chamber to the left in Figure 1, thence with the left hand tire through the flexible connection 29. The companion passage 30 communicates with the air chamber to the right in Figure 1, thence with the right hand tire through the flexible connection 31.

The valve described not only allows for the inflation of the tires simultaneously but when the pressure in one tire is in excess of that in the companion tire, it is necessary only to back out the plug 23 and allow the pressure in each chamber to become equalized. It will be noted that the plug 23 has air passages 32 which communicate with the larger passage 24. It is through these passages 32 that air is injected by way of the back pressure valve 33 into the chambers.

The structure shown in Figure 3 is a modified form of the invention inasmuch as it affords an attachment to vehicle wheels of conventional design. It is of course possible without affecting the principle of the invention to adapt the modified form in the construction of a wheel as a unit. Moreover, by dispensing with the diaphragm and dual air exchange conduits, the modified form may be employed for relieving a single vehicle tire of the strain of increased pressure due to shocks imposed thereon or overheating as by friction or the like.

The wheel shown is comprised of interchangeable rim sections 34 with integral, concave discs or flanges 35. The hub 36 has an annular shoulder 37 integral therewith against which the inner edges of the flanges 35 are secured by bolts 38. The tires 39 are secured conventionally by the split rings 40.

The device embodying the invention is comprised of the annularly convex flanges 41 between which is interposed the diaphragm 42, its inner edges being firmly embraced by the flanges and so held by the bolts 38. The flanges are spaced from the wheel flanges 35 by spacing ferrules 43 which surround the bolts.

The air chamber defined by the left hand flange 41 and the diaphragm 42 communicates with the left hand tire through the flexible tube or conduit 44 while the tube 45 effects communication between the right hand tire and the companion air chamber.

Air is initially introduced into the device through the valve 46, which may be of conventional design and transfer of air into the left hand chamber is made through the tube 47 at the top of the assembly. The valve 48 in this tube is normally closed and is opened only at the time the tires are inflated through the air chambers by way of the valve 46, or when it is desired to equalize the air pressure in the tires.

As stated previously, heat caused by friction and otherwise, frequently raises the pressure in the tires of the heavy duty type to a dangerous degree, particularly since the tires are usually inflated to a high degree in order to support the loads they are required to carry. Stones and other obstacles as well as road irregularities likewise cause momentary increase in pressure which is sometimes dangerous.

The present invention obviates any ill effects on the tires due to occurrences such as outlined by the rapid and almost instantaneous exchange of air between the tire and its respective air reserve chamber, the diaphragm assuming the shock rather than the tire. The diaphragm, in view of the comparatively large area exposed to the pressure is sensitive to the slightest rise in pressure and its pulsations are rapid, hence the device is capable of responding to both minor and major pressure variations.

Manifestly, the construction shown is capable of considerable modification and such modification as is considered within the scope and meaning of the appended claims is also considered within the spirit and intent of the invention.

What is claimed is:

1. A pressure regulator and equalizer for vehicle tires including an annular chamber and a flexible diaphragm, dividing said chamber into compartments each communicating separately with a vehicle tire, means for inflating said tires through said chamber and means to effect exchange of air between said compartments.

2. A pressure regulator and equalizer for vehicle tires including an annular pressure reserve chamber, a flexible diaphragm defining separate compartments in said chamber, each having communication with a vehicle tire whereby said diaphragm will be exposed to the pressure in each of said tires, means to inflate said tires through said compartments individually and means to effect exchange of air between said chambers.

3. A pressure regulator and equalizer for vehicle tires including an air tight chamber in fixed relation to a vehicle tire, means for inflating said tire through said chamber, said latter means being likewise effective in affording a continuous exchange of air between said tire and said chamber and a flexible diaphragm dividing said chamber into separate compartments, each communicating with a vehicle tire.

4. A device for equalizing and regulating air pressure in dual vehicle tires including an annular chamber and a flexible diaphragm defining separate air compartments within said chamber, each having continuous communication with a vehicle tire whereby said diaphragm will be exposed to the pressure in each of said tires, means for inflating said tires through said chamber and means to effect exchange of air between said compartments.

5. A device for equalizing and regulating pressure of air in vehicle tires including an air tight chamber and a flexible diaphragm dividing said chamber into compartments, each having continuous communication with a tire, means for inflating said tires and means for transferring air from one compartment to another.

RAYMON R. HAINES.